(12) United States Patent
Manska

(10) Patent No.: US 8,337,580 B2
(45) Date of Patent: Dec. 25, 2012

(54) DEBRIS SEPARATOR

(76) Inventor: Wayne E. Manska, Arroyo Grande, CA (US)

( * ) Notice: Subject to any disclaimer, the term of this patent is extended or adjusted under 35 U.S.C. 154(b) by 236 days.

(21) Appl. No.: 12/807,392

(22) Filed: Sep. 3, 2010

(65) Prior Publication Data

US 2012/0055125 A1  Mar. 8, 2012

(51) Int. Cl.
*B01D 45/00*  (2006.01)
(52) U.S. Cl. ............... 55/394; 55/368; 55/462; 55/467; 55/337; 55/426; 55/429; 55/DIG. 18
(58) Field of Classification Search .................. 55/368, 55/462, 467, DIG. 18, 337, 426, 429, 394
See application file for complete search history.

(56) References Cited

U.S. PATENT DOCUMENTS

| | | | | |
|---|---|---|---|---|
| 3,822,533 A | * | 7/1974 | Oranje | 55/394 |
| 4,341,540 A | * | 7/1982 | Howerin | 55/307 |
| 4,476,608 A | * | 10/1984 | Rasmussen | 15/353 |
| 5,096,472 A | * | 3/1992 | Perry | 95/278 |
| 5,525,396 A | * | 6/1996 | Rudolph et al. | 428/131 |
| 5,904,755 A | * | 5/1999 | Kanazashi et al. | 96/55 |
| 6,027,541 A | * | 2/2000 | Siemers | 55/429 |
| 6,210,457 B1 | * | 4/2001 | Siemers | 55/429 |
| 6,251,296 B1 | * | 6/2001 | Conrad et al. | 210/806 |
| 6,767,380 B2 | * | 7/2004 | von Stackelberg, Jr. | 55/431 |
| D495,347 S | * | 8/2004 | Erbach | D15/138 |
| 7,128,770 B2 | | 10/2006 | Oh et al. | |
| 7,282,074 B1 | | 10/2007 | Witter | |
| 2004/0089157 A1 | * | 5/2004 | von Stackelberg, Jr. | 96/406 |
| 2009/0133370 A1 | * | 5/2009 | Yoo et al. | 55/429 |
| 2010/0132317 A1 | | 6/2010 | Thien | |
| 2010/0206173 A1 | * | 8/2010 | Oh | 96/424 |

* cited by examiner

*Primary Examiner* — Jason M. Greene
*Assistant Examiner* — Dung H Bui

(57) ABSTRACT

The present invention is a device that rapidly and effectively separates and collects debris from airflow between a debris source and a vacuum source. The device comprises a first chamber situated above and adjoining a second chamber. The first chamber functions to separate and remove the debris and the second chamber functions to collect the debris. The first chamber is circular in cross-section and comprises an upper portion and a downward and outward sloping sidewall. The upper portion has an output port connected by a first conduit to the vacuum source and the sidewall has an input port connected by a second conduit to the debris source. Air and debris are drawn into the first chamber through the input port by suction created at the output port. The debris is centrifugally forced to the sidewall whereby it is then centripetally forced downward into the second chamber through a peripheral opening between the sidewall and a barrier, while cleaned air is evacuated through the output port.

20 Claims, 7 Drawing Sheets

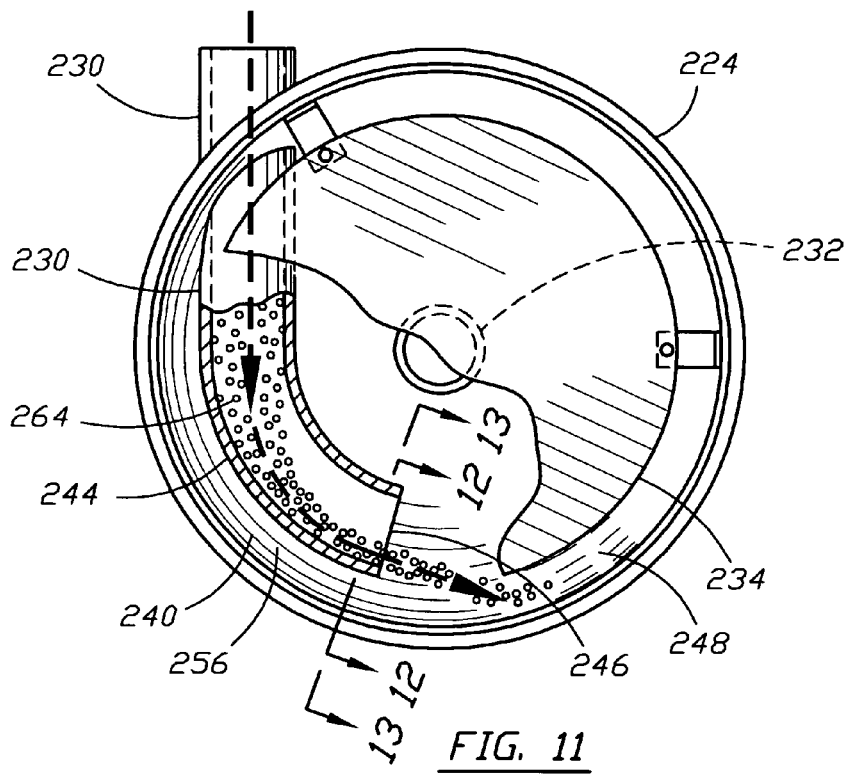
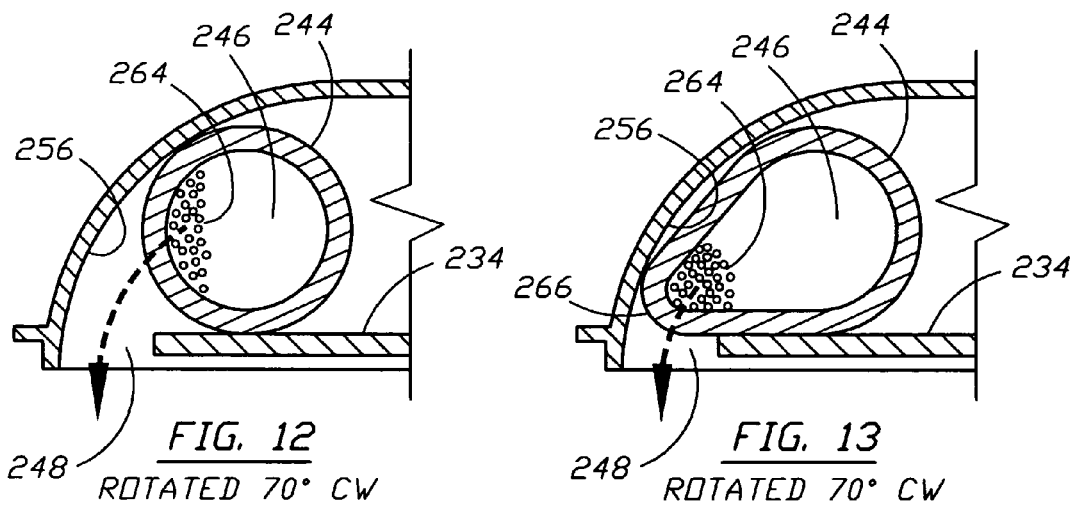

ROTATED 90° CW

DEBRIS SEPARATOR

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

The present invention relates to dust separators and collectors commonly used by wood workers to separate and collect debris composed of particulates such as sawdust and shavings created by debris sources; i.e. power tools such as saws, sanders, jointers, routers, etc. Certain types of dust collectors generally comprise two chambers having an opening therebetween. The first chamber functions to separate the debris from an airflow created by a vacuum source such as a shop-vac. The second chamber, which is situated below the first chamber, collects the debris that falls by gravity therein through the opening. Dust collectors are situated between the debris source and the vacuum source and function to remove as much of the debris as possible before it enters the vacuum source. This retards clogging of the vacuum's filter, necessitating its replacement or cleaning less often. The reduced clogging also permits the vacuum source to operate more efficiently for a longer time.

The first chamber is typically circular in cross-section and comprises cylindrical or funnel-shaped sidewalls. The first chamber also includes an input port and an output port. The input port comprises an inlet and connects a first conduit to the debris source. The output port, which is centrally situated at the top of the first chamber, comprises an outlet and connects a second conduit to the vacuum source. In these devices, air and debris are drawn into the first chamber through the inlet by suction created at the outlet. The input port is positioned laterally with respect to the output port and is oriented such that the airflow is drawn into the first chamber in a tangential, cyclonic manner. The opening at the bottom of the first chamber has a cross-sectional area that is significantly smaller than the cross-sectional area of the second chamber. Accordingly, airflow velocity and turbulence decreases dramatically below the opening and the debris that falls therethrough tends to slow and settle into the second chamber. This also reduces the tendency of the debris in the second chamber to re-enter the first chamber. In some devices, the opening is an annular space around a skirt or baffle at the bottom of the first chamber. In another device it is simply a centrally situated round opening at the bottom of a funnel-shaped first chamber.

In some prior-art devices, the inlet is positioned above the outlet. Consequently, the airflow and debris spiral downward along the first chamber's sidewall toward the outlet. In other devices the inlet and outlet are substantially on the same plane whereby incoming the airflow and debris initially follow a substantially circular path. In any case, the airborne debris is centrifugally forced to the sidewall and travels along a path dictated by the sidewall's contour, the airflow direction, and gravity. The airflow below the outlet then becomes a vortex that spirals inward and upward toward the outlet. Accordingly, any downward movement of the debris caused by airflow essentially ceases below the outlet. These devices must rely solely on the force of gravity for the final movement of the debris through the opening. Since the debris is often comprised of small particulates of low specific gravity, some will dwell in the vortex for sufficient time that it is drawn into the outlet.

Since prior-art devices, and the present invention, relate to the physics of objects striking and sliding on surfaces, the following must be understood: The path of an object before and after striking a flat surface will be on a plane that is perpendicular to the flat surface. And when an airborne object strikes a curved surface it will follow a path along a plane that is perpendicular to a plane tangent to the curved surface at the point of contact. This is true even in the case of conical, spherical or other compound-curved surfaces. And when an object slides on an inwardly curving surface it is acted on by centripetal forces normal to a plane tangent to the surface whereat the object presently exists. The path of the object is accordingly dictated by these centripetal forces. Simply put, objects sliding on surfaces will follow the path of least resistance.

There is disclosed in U.S. Pat. No. 7,282,074 (Witter) a dust-collecting device comprising a funnel-shaped first chamber having a downwardly reducing diameter, and a cylindrical second chamber. The first chamber; has an output port centrally positioned at its top; an input port tangentially oriented on its side adjacent the top; and a centrally positioned opening at the bottom that communicates with the second chamber. The output port comprises a conduit that protrudes downward into the first chamber to approximately two-thirds the chamber's depth and has an outlet thereat. In use, the incoming airflow and debris are caused by suction at the outlet to spiral downward along the conical sidewall of the first chamber from the inlet toward the outlet. As discussed above in the comments about the physics of objects striking and sliding on curved surfaces, the debris must overcome its tendency to spiral upward as it travels along the funnel-shaped sidewalls. In the portion above the outlet, the combined forces of the air current and gravity overcome this tendency. However, adjacent and below the outlet any downward movement of the air ceases and any subsequent downward movement of the debris is solely due to gravity. In fact, the funnel shape of the first chamber not only inhibits downward movement of the debris, it conveys the debris close to the outlet where some is likely to be drawn therein and not passed on to the second chamber.

Another device described in U.S. Pat. No. 7,128,770 (Oh, et al.) discloses a cyclone type dust collector that basically comprises four chambers. The first chamber is cylindrical in form and includes: a tangential oriented input port having an inlet disposed on its upper surface adjacent its cylindrical wall for the incoming air and debris; a cylindrical first output port centrally positioned on its upper surface and having solid walls at its upper portion and a first outlet comprising a grill having perforations around its lower portion. The perforations are for allowing the passage of small particulates, while preventing larger particulates from exiting through the first outlet to the third chamber; and, a skirt at the bottom of the lower portion defining an annular space between the skirt and the cylindrical walls of the first chamber through which the larger particulates may pass to the second chamber. The skirt also comprises a declining upper surface that terminates at a cutout part through which even larger particulates may fall into the second chamber. The second chamber is for collecting the particulates separated from the first chamber. The third chamber comprises an annular array of cones that cyclonically separate and collect the fine particulate material entering through the grill from the first chamber. The fourth chamber comprises a second output port for connecting to a vacuum source. Essentially, the device first separates the larger particulate mater in the first chamber and then removes the finer matter in the third chamber.

The inlet to the first chamber is the terminal opening of a gradually lowering air guide wall that communicates to a debris source. Therefore, as the debris enters the first chamber it is initially directed somewhat downwardly in a circular path around the upper, solid-walled upper portion of the first output port. The continued downward spiral of the debris is caused by the suction through the perforations on the lower portion. As is typical of cyclone type dust collectors, and in accordance with the laws of fluid dynamics, the debris-borne airflow of Oh's device slows as it enters the large cross-sectional space of the first chamber through the smaller cross-sectional opening of the inlet. Accordingly, the airborne-debris travels downward guided by the chamber's cylindrical walls in a spiraling path around the solid-walled upper portion at this reduced rate. As it circles the lower perforated portion, literally all of the air and some of the debris pass through the perforations in route to the vacuum source. Due to the relatively large height and diameter of the lower perforated portion the debris is subject to being drawn through the perforations for a relatively long time and distance. Consequently, as intended, some of the finer particulates are drawn in through the perforations. And the fact that a grill is incorporated at all suggests it is expected even some of the larger particulates will also be drawn thereto. In which case clogging of the perforations could occur which would reduce the efficiency of the grill and therefore, the device. Since all of the incoming air passes through the grill, plus the fact that the walls of the first chamber are cylindrical, any downward bias to the debris flow caused by the suction through the grill literally ceases at the lower end of the grill. Therefore, the circling particulate matter that evades entering the grill relies entirely on gravity to fall through the annular opening into the second chamber.

It is apparent the geometries and proximities of the key elements of first and second chambers of Oh's device simply do not effect sufficient removal of debris, and that the device relies on the third chamber to complete the job. Although Oh's device may function to remove a large percentage of the particulate matter from the incoming airflow, it does have certain drawbacks. Primarily, it is quite complicated and has many parts that would be expensive to produce and assemble. It also has a multitude of small spaces and crevices where dust may accumulate that would be difficult to access and clean.

And another device for separating and collecting debris from airflow is disclosed in U.S. patent application Ser. No. 12/624,022 (Thien). This device comprises a first chamber that removes debris from incoming airflow and is situated above a second chamber that collects the debris. A substantially cylindrical vessel such as a pail or trashcan is provided that forms sidewalls for both the first and second chambers. The first chamber, which is vertically compressed in comparison to those of the Witter and Oh devices, comprises: the upper sidewall of the vessel; a flat, round lid; and a baffle coaxially suspended below the lid by spacers approximately three inches long. The baffle has a perimeter comprising two arc segments having different radii. The larger radius is equal to the inside radius of the vessel and extends for 120-degrees of the baffle's perimeter thereby forming a seal between the baffle and the first chamber's wall for this arc distance. The smaller radius is 1⅛ inch smaller than the larger radius and extends the remaining 240-degrees thereby forming an opening for this arc distance between the baffle and the first chamber's wall. The lid is somewhat larger than the upper rim of the vessel and rests thereon. The lid has a centrally positioned output port for the purpose of attaching a first flexible conduit to a vacuum source. The lid also has a tangentially positioned input port comprising a 90-degree elbow. One end of the elbow protrudes above the lid for the attachment of a second flexible conduit that would go to a debris source. The other end of the elbow is situated between the lid and baffle in a tangential orientation to the both the vessel wall and the upper surface of the larger radius portion of the baffle.

In use, a vacuum source connected via the first flexible conduit creates a suction that draws in debris through the input port via the second flexible conduit from the debris source. The incoming air/debris is then directed tangentially along the walls of the first chamber in a cyclonic manner and most of the debris eventually falls, solely by gravity, into the second chamber through the 240-degree opening. The walls of the vessels are either cylindrical or sloped slightly downward and inward as is the case with many trashcans and pails. Therefore the path of the incoming airflow is circular or may even have an upward bias in the instance where the container walls are sloped. In either case, since the debris is often of small size and low specific gravity, its presence in the first chamber is prolonged making it more susceptible to being drawn into the outlet port.

The Witter, Oh, Thien and other prior-art devices have a common deficiency. They rely solely on the force of gravity to overcome the force of a vortex of air swirling to the outlet. And since the debris is often of small size and low specific gravity some dwells below the outlet for sufficient time that it is drawn by the vortex into the outlet and not collected as intended.

Accordingly, there is a need in the art for a device of simple design that employs a force in addition to gravity to rapidly separate, remove and collect debris from airflow.

SUMMARY OF THE INVENTION

The present invention is a device that rapidly and effectively separates, removes and collects debris particulates such as sawdust and wood shavings from airflow between a debris source such as a woodworker's power tool and a vacuum source such as a shop-vac.

The device comprises a first chamber that separates the debris from the airflow and a second chamber that collects the separated debris. The first chamber is situated above the second chamber and joined thereto. The first chamber comprises a shroud, a barrier, an input port, and an output port. The shroud is circular in cross-section about a vertical axis of rotation and has an upper portion, a contiguous sidewall that slopes outward in a downwardly direction, a lower edge, and a joining means for adjoining the second chamber. As used herein "slope" includes both straight and curved surfaces that deviate from the horizontal or vertical. Basically, the shroud is shaped like an inverted bowl. The barrier is substantially disk-shaped and mounted just above and parallel to the shroud's lower edge thereby forming a bottom surface of the first chamber and a top surface of the second chamber. The barrier is sized so that approximately a one-inch peripheral opening exists between the barrier's edge and the sidewall. The barrier functions to greatly diminish turbulence in the second chamber that is created in the first chamber while permitting debris to pass through the peripheral opening to the second chamber. The input port passes through the sidewall or upper portion and comprises an outer portion having a first externally disposed connection means for connecting a first conduit such as a hose or pipe to the debris source, and an inner portion having terminating at an inlet. The input port is situated just above the barrier and is geometrically configured to direct incoming airflow and debris through the inlet into the first chamber in a direction tangential to the sidewall and parallel to the barrier. The output port is centrally positioned on the upper portion and comprises a second externally disposed connection means for connecting a second conduit to the vacuum source, and an internally disposed outlet.

The downward and outward sloping sidewall may be conical in form whereby planes tangent anywhere thereto create a constant angle between the plane and the vertical axis. Alternatively, the sidewall may have a spherical radius, or be otherwise curved, whereby planes tangent thereto create angles with the vertical axis that progressively diminish toward the lower edge. When debris is drawn into the first chamber through the inlet, it rapidly encounters the sloping sidewall. It is then directed in a downward spiral by centripetal forces exerted by the sidewall in a direction normal to the aforementioned tangent planes. In the case of a conical sidewall, the centripetal force direction is at a constant angle with respect to the vertical axis. However, in the case of a curved sidewall the direction of the centripetal force varies with respect to its location whereby debris particulates at higher locations will encounter a more downward centripetal force and move more rapidly downward than those at lower locations. This can be advantageous since particulates entering through the inlet may encounter the sidewall at various heights. In any case, the downward forces cause the debris to rapidly vacate the first chamber through the peripheral opening and enter the second chamber. And, since the airflow and turbulence is greatly reduced in the second chamber the debris settles therein by gravity.

In certain embodiments of the invention, the inner portion of the input port is straight. Consequently, the debris particulates are substantially evenly distributed in the airflow and travel in a substantially straight line as they enter the first chamber. In this case particulates nearer the vertical axis will contact the sidewall at a greater distance from the inlet than those further from the vertical axis. In other embodiments, the input port curves inwardly along the sidewall. In this case, particulates are centrifugally concentrated along the input port's outer wall. As a result, a more particulates entering the first chamber will contact the sidewall nearer the inlet than in the case of a straight input port.

It is preferable in all embodiments that the contour of the sidewall and the configuration of the input port combine to direct a vast majority of the debris downward through the annular space within one revolution of the sidewall. Accordingly, the debris is removed before it re-encounters the internal portion of the input port where turbulence may be created that would cause some debris to be drawn into the outlet.

Accordingly, it is an object of the present invention to provide a debris separator having a first chamber that effectivly separates and removes a higher percentage of debris from airflow.

Another object of the invention is to provide a debris separator that employs forces other that gravity to rapidly remove debris from airflow so that it does not dwell adjacent an outlet.

Yet another object of the invention is to provide a debris separator that employs centripetal forces.

And yet another object of the invention is to provide a debris separator that removes debris from airflow within less than one revolution of a first chamber.

BRIEF DESCRIPTION OF THE DRAWINGS

These and other considerations and features of the present invention may be more fully understood through reference to the drawings in which:

FIG. 11 is a bottom view of a first chamber showing an input port having a curved inner portion.

FIG. 12 is an enlarged cross-sectional view taken along lines 12-12 of FIG. 11 showing a concentration of particulates in the curved inner portion having a round cross-section.

FIG. 13 is an enlarged cross-sectional view taken along lines 13-13 of FIG. 11 showing a concentration of particulates in the curved inner portion having an alternate, teardrop-shaped cross-section.

DETAILED DESCRIPTION OF THE PREFERRED EMBODIMENTS

Figure 1:
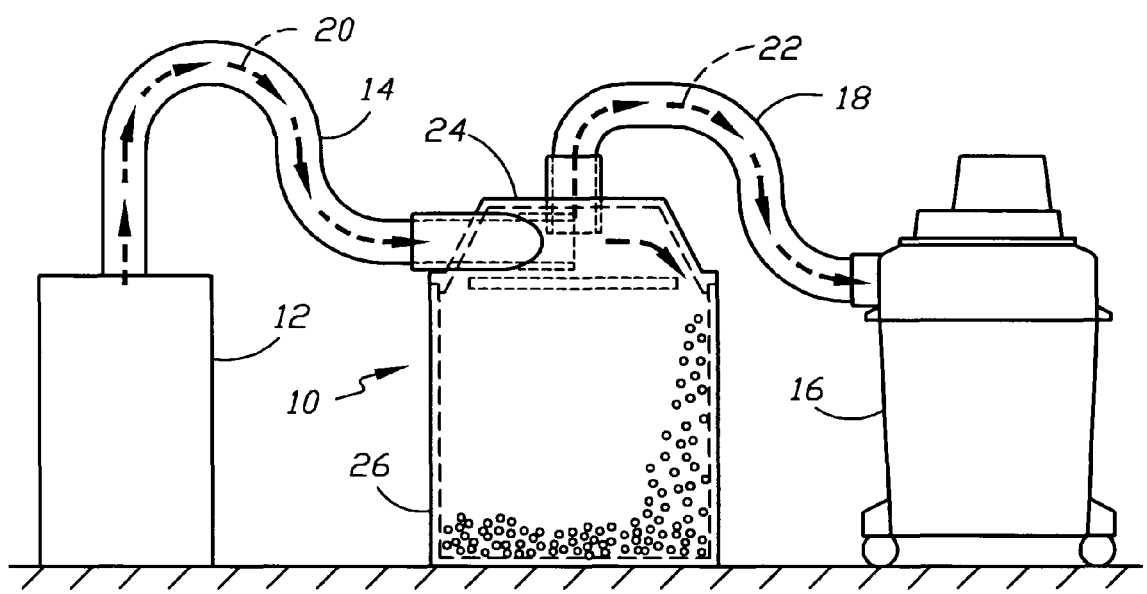
FIG. 1 shows a diagram of the debris separator of the present invention intermediately disposed between a debris source and a vacuum source.

Referring now to the drawings, there is shown in FIG. 1 a debris separator 10 of the present invention connected to a debris source 12 by a first conduit 14, and also to a vacuum source 16 by a second conduit 18. The first conduit 14 conveys debris-borne airflow 20 to the debris separator 10 while the second conduit 18 conveys substantially cleaned airflow 22 to the vacuum source 16. The debris source 12 may be, for example, a woodworker's power tool such as a table saw, or simply a pile of rubble. The debris separator 10 comprises a first chamber 24 and a second chamber 26 that is situated below the first chamber 24. The first chamber 24 functions to separate debris from the debris-borne airflow 20. The second chamber 26, which may be a commonly available pail or trashcan, functions to collect the separated debris.

Figure 2:
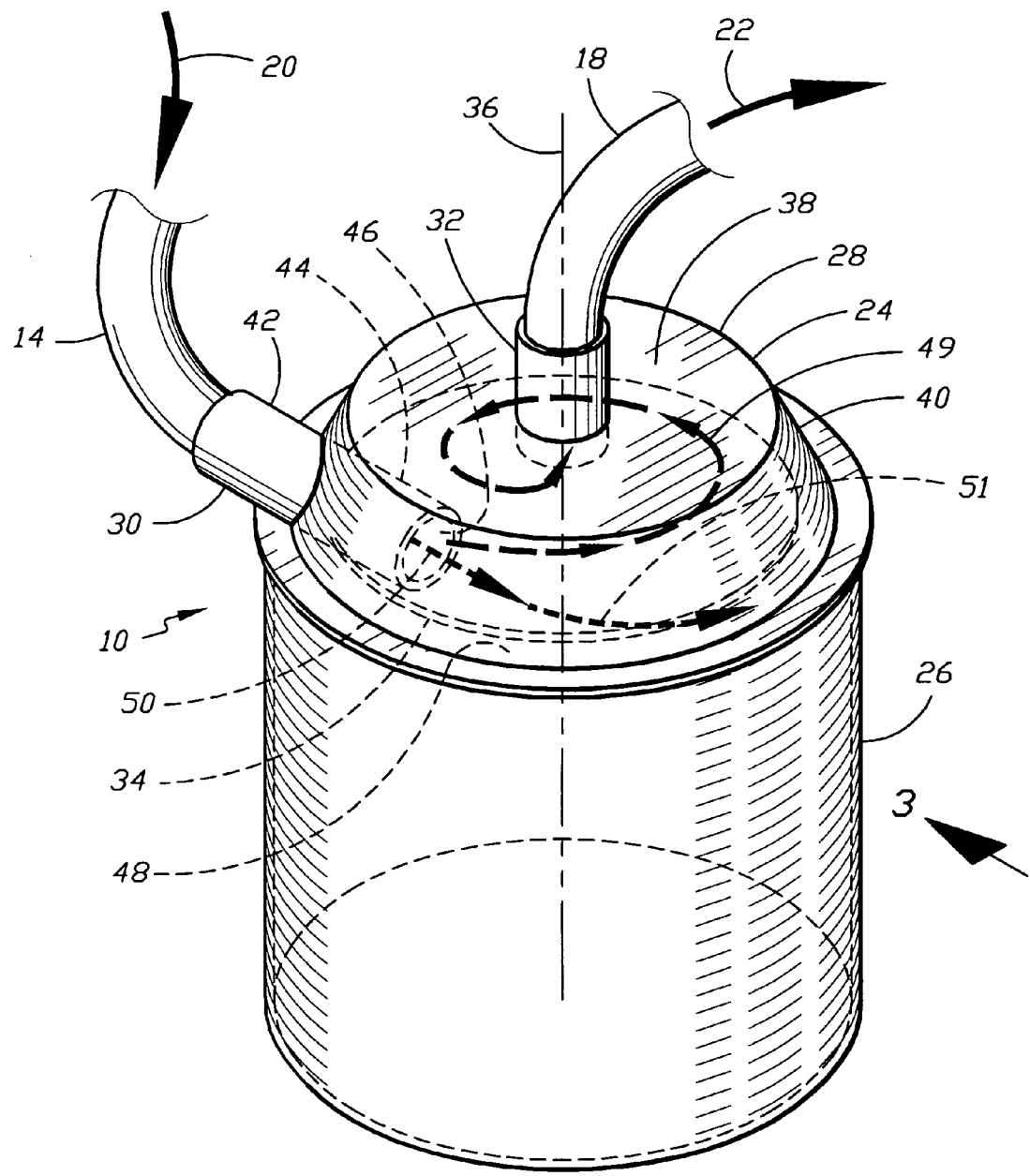
FIG. 2 is an isometric view of the debris separator of FIG. 1 showing a first chamber that separates debris from airflow and a second chamber that collects the debris.

FIG. 2 illustrates a preferred embodiment of the debris separator 10 shown in FIG. 1 whereby the first chamber 24 comprises a shroud 28, an input port 30, an output port 32, and a barrier 34. The shroud 28 is circular in cross-section about a vertical axis of rotation 36 and has a flat upper portion 38 and a conical-shaped downward and outward sloping sidewall 40. The input port 30 passes through the sidewall 40 in a tangential orientation and has an outer portion 42 that is adapted to connect to the first conduit 14, and a straight inner portion 44 terminating at an inlet 46. The output port 32 passes through the center of the upper portion 38 and is adapted to externally connect to the second conduit 18. The barrier 34 is disk-shaped and sized such that a peripheral opening 48 remains between the barrier's edge and the sidewall 40. The debris-borne airflow 20 is caused to enter the first chamber 24 through the input port 30 by suction created at the output port 32. Due to the tangential orientation of the input port 30 and the central location of the output port 32, a vortex of turbulent air 49 is created in the first chamber 24 in the space below the output port 32. However, since the debris has more inertia than the air it initially travels in a straight path 50 until contacting the sidewall 40. The debris is then centripetally directed in a downward spiral by the sloping sidewall along a curved path 51 until it passes through the peripheral opening 48. The barrier 34 functions to greatly reduce turbulence in the second chamber 26 and accordingly inhibits debris from re-entering the first chamber 24 where it would be subject to being drawn into the output port 32. As a result, only cleaned airflow 22 is conveyed to the vacuum source (not shown).

Figure 3:
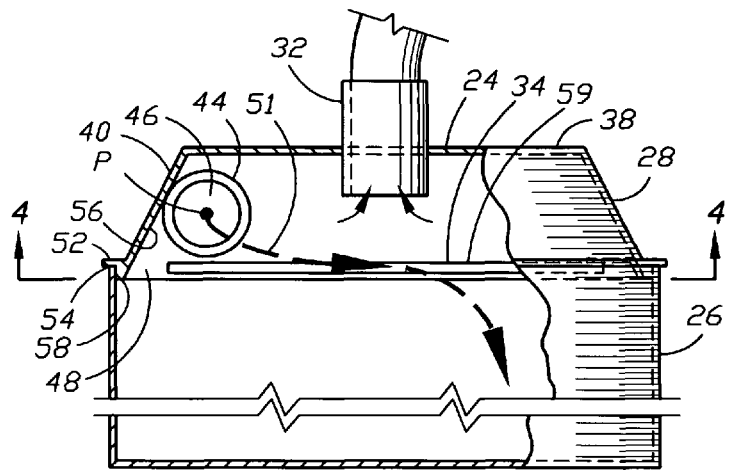
FIG. 3 is a partially sectioned side view of the debris separator as seen along the line of sight 3 of FIG. 2.
Figure 6:
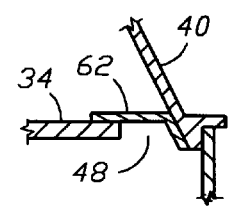
FIG. 6 is an enlarged cross-sectional view taken along lines 6-6 of FIG. 4 showing a connection means for a barrier.
Figure 4:
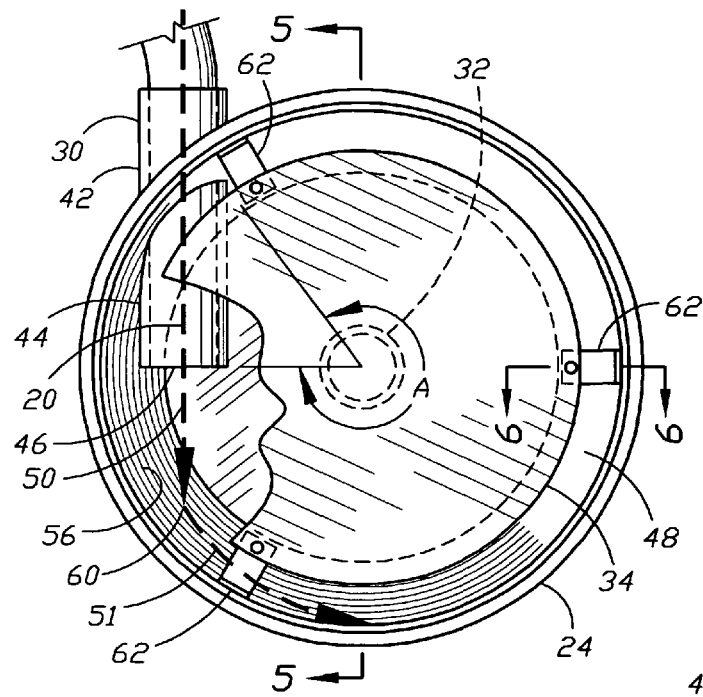
FIG. 4 is a bottom view of the first chamber taken along lines 4-4 of FIG. 3.
Figure 5:
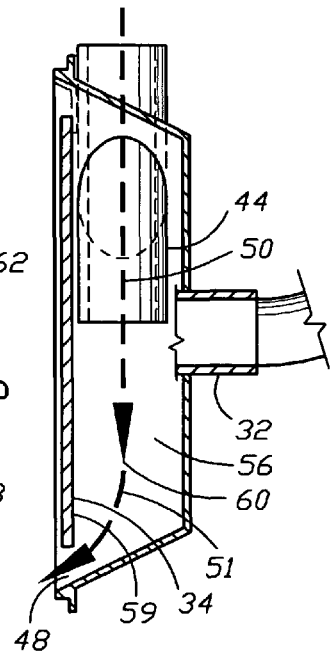
FIG. 5 is a cross-sectional view taken along lines 5-5 of FIG. 4 showing the path of a particulate in the first chamber.

As shown in FIG. 3, the sidewall 40 comprises a lower portion 52 configured to join and seal with an upper edge 54 of the second chamber 26. The sidewall 40 has an inner surface 56 that slopes downward to a lower edge 58. The slope of the inner surface 56 extends from above the inlet 46 to below an upper surface 59 of the barrier 34. The barrier 34 is positioned above the lower edge 58 and just below the inner portion 44 of the input port 30. The lower edge 58, barrier 34, inner portion 44 and upper portion 38 are co-planar with one another. Referring to FIG. 4, the barrier 34 is sized so that the peripheral opening 48 between the barrier 34 and the inner surface 56 is approximately one-inch wide. When the debris borne airflow 20 enters the first chamber 24 through the inlet 46, the debris' inertia causes it to travel along the straight path 50 until it contacts the inner surface 56. For example, debris particulate P centered in the input port 30 (FIG. 3) would travel along the straight path 50 (FIGS. 4, 5) until encountering the inner surface 56 at a point 60. Then, due to the slope of the inner surface 56, the particulate P would be centripetally directed downward along the curved path 51 (FIGS. 3-6) until it exits through the peripheral opening 48 into the second chamber 26. Although particulates entering from other portions of the inlet 46 would encounter the inner surface 56 at other points, all would be similarly directed downward through the peripheral opening 48. The slope of the sidewall 40 is such that all particulates would be so directed within the arc distance A, whereby the arc distance A is the radial distance along the inner surface 56 from the inlet 46 to the inner portion 44, even in the absence of gravity. This is so the particulates do not re-encounter the inner portion 44 of the input port 30 where turbulence is created that may direct some to the output port 32. And since the barrier 34 functions to greatly diminish turbulence in the second chamber 26 the debris settles therein by gravity. As shown in FIGS. 4 and 6, the barrier 34 is attached to the sidewall 40 by brackets 62. Ideally, the brackets 62 are configured and positioned so they minimally inhibit debris flow to and through the peripheral opening 48.

Figure 7:
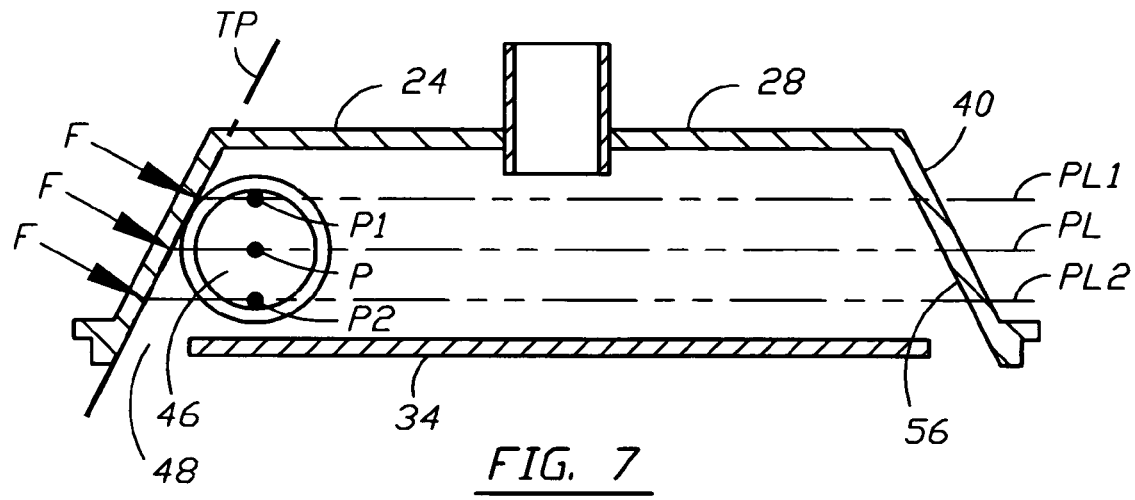
FIG. 7 is a diagram showing force vectors on particulates encountering a conical sidewall of the first chamber.
Figure 8:
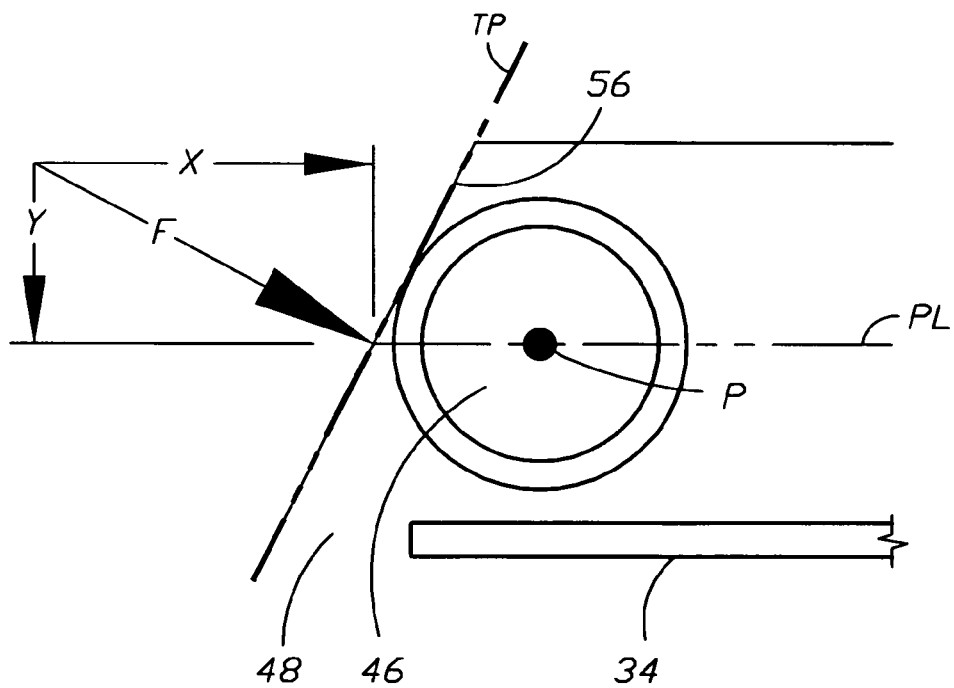
FIG. 8 is a diagram showing x- and y-components of the force vectors shown in FIG. 7.

FIG. 7 shows the shroud 28, the inlet 46, the conical sidewall 40, the barrier 34, and the peripheral opening 48 of the first chamber 24 of FIGS. 2-6. Particulates P, P1, P2 exit the inlet 46 and travel along planes PL, PL1, PL2, respectively, until contacting the inner surface 56. They are then acted on by centripetal forces F having a vector normal to a plane TP tangent to the inner surface 56. Since the inner surface 56 is conical all planes tangent thereto are at the same angle with respect to planes PL, PL1, PL2. Accordingly, all forces F have identical vectors. As shown in FIG. 8 the vector of force F has an x-component X and a y-component Y. It is the y-component Y that causes particulates P, P1, P2 to be directed in a downward path along the inner surface 56. Since all forces F have identical vectors it follows that all x-components X and y-components Y are also equal. Consequently, all particulates P, P1, P2 travel downward in similar paths along the inner surface 56 toward the peripheral opening 48.

Figure 9:
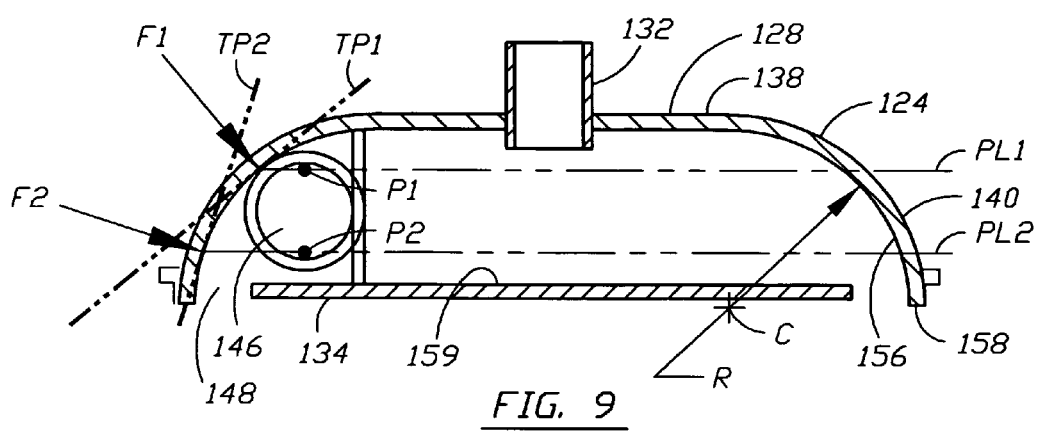
FIG. 9 is a diagram showing force vectors on particulates encountering a curved sidewall of a first chamber.
Figure 10:
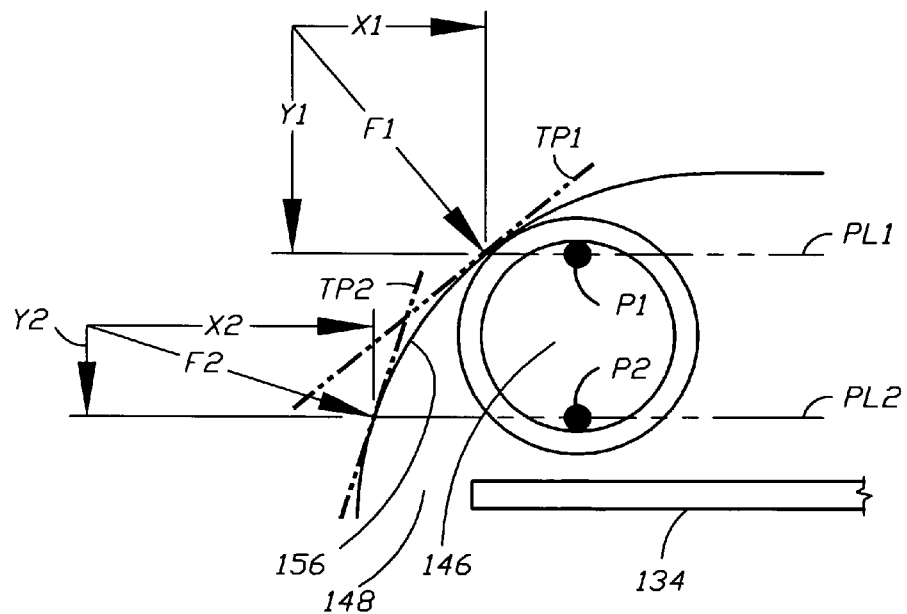
FIG. 10 is a diagram showing x- and y-components of the force vectors shown in FIG. 9.

FIG. 9 shows an alternate preferred embodiment of a first chamber of the present invention comprising a shroud 128, an inlet 146, an output port 132, and a barrier 134. This embodiment is similar to that shown in FIGS. 2-6 except that the sidewall 140 has an inner surface 156 that curves downward and outward from the upper portion 138 to the lower edge 158. Otherwise, all other features, components, and spatial relationships are the same. The curve of the inner surface 156 has a radius R with a center C that is below the upper surface 159 of the barrier 134. Accordingly, the inner surface 156 slopes outward and downward to a point below the upper surface 159. When particulates P1, P2 enter the first chamber 124 they travel along planes PL1, PL2, respectively. When they encounter the inner surface 156 they are acted on by centripetal forces represented by vectors F1, F2, respectively, normal to planes TP1, TP2, respectively, that are tangent to the curved inner surface 156. In this embodiment the vectors F1, F2 are different from one another and accordingly have a different x-component and y-component as shown in FIG. 10. For example, vector F1 has a smaller x-component X1 and a larger y-component Y1 than the corresponding x-component X2 and Y-component Y2 of vector F2. Essentially, y-components are greater at higher locations than at lower locations. Consequently, particulates at higher locations are directed downward along steeper paths to the peripheral opening 148 than particulates at lower locations. This is advantageous as it helps facilitate removal of substantially all particulates through the peripheral opening within the arc distance A described above with respect to FIG. 4. And it is particularly helpful in the case of smaller first chambers having shorter arc distances. Or, in embodiments such as those described below with respect to FIGS. 11-16 where the inner portion is curved and the arc distance is subsequently decreased.

FIG. 11 shows another preferred embodiment of a first chamber 224 substantially identical to that represented in FIG. 9 except that the inner portion 244 of the input port 230 curves along the inner surface 256 of the sidewall 240. Consequently, particulates 264 are centrifugally forced to the outer wall of the inner portion 244 where they become concentrated as shown in FIG. 12. Since all the particulates 264 thereby exit the inlet 246 nearer the inner surface 256 they travel a shorter distance before being acted upon by centripetal forces exerted by the inner surface 256. Accordingly, the particulates 264 are more quickly evacuated through the peripheral opening 248; and, therefore are even less likely to be drawn into the output port 232. FIG. 13 shows an alternate, teardrop-shaped, cross-section of the inner portion 244 whereby the teardrop shape has an apex 266 adjacent the inner surface 256 and just above the barrier 234. This shape causes the particulates 264 to be forced into the apex 266 by centrifugal forces resulting in an even shorter distance for them to travel to the peripheral opening 248.

Figure 14:
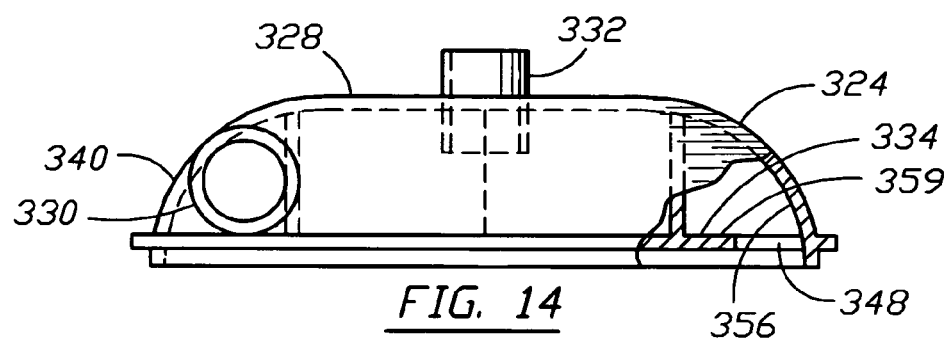
FIG. 14 is a side view of a first chamber having a peripheral opening in a curved inner portion of an input port.
Figure 15:
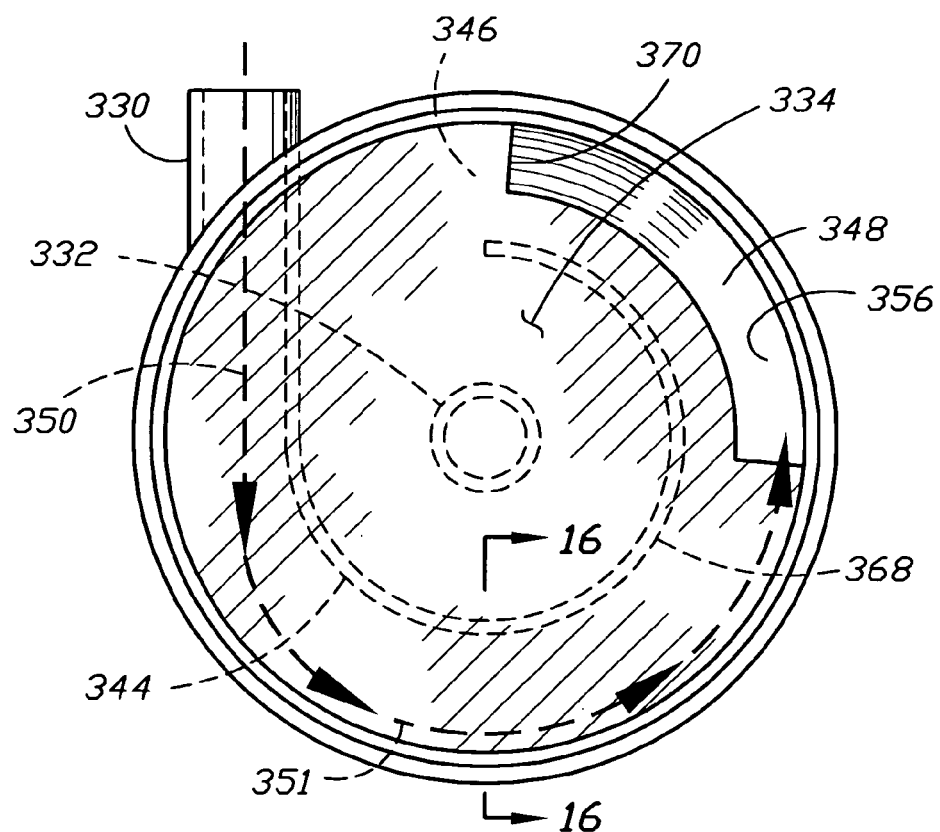
FIG. 15 is a bottom view the first chamber orthographically projected from FIG. 14.
Figure 16:
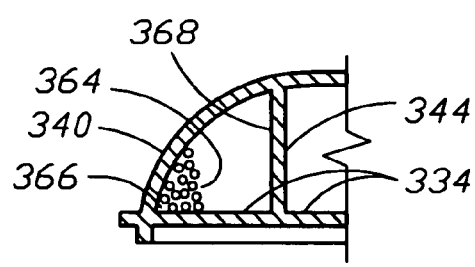
FIG. 16 is a cross-sectional view taken along lines 16-16 of FIG. 15 showing a concentration of particulates at an apex.

In the foregoing embodiments peripheral openings have been shown to be a full 360 degrees around the barriers. However, the length of the peripheral opening need only be long enough to effectively evacuate substantially all of the debris into the second chamber before it re-encounters the inner portion of the input port. Therefore, in embodiments where the contours and shapes of the sidewall and input port cause the debris to be rapidly concentrated in the lower, outer portion of the first chamber, the peripheral opening may be foreshortened. For instance, there is shown in FIGS. 14-16 a first chamber 324 comprising: a shroud 328 having a curved sidewall 340; an input port 330 having a curved inner portion 344 that extends for approximately 270 degrees along the inner surface 356 of the sidewall 340; an output port 332; and a barrier 334. Referring to FIG. 16, the cross-sectional perimeter of the inner portion 344 comprises surfaces of a portion of the sidewall 340, an outer portion of the barrier 334 that adjoins the sidewall 340, and an inner wall 368. An apex 366 is formed in the lower, outer corner where the sidewall 340 and barrier 334 join and whereat particulates 364 are centrifugally concentrated. The particulates 364 are thereby caused to follow straight and curved paths 350, 351, respectively, through the inner portion 344 (FIG. 15). As shown in FIG. 15, the inner wall 368 terminates at an inlet 346. The peripheral opening 348 extends, in this example, for approximately 90 degrees and has a trailing edge 370 adjacent the inlet 346; whereby, at least a major portion of the peripheral opening 348 is within the inner portion 344. The sidewall has an inner surface 356 that extends downward and outward below the upper surface 359 of the barrier 334 in the area of the peripheral opening 348 as shown in FIG. 14. Accordingly, substantially all of the debris is removed even before it exits the inlet 346 and enters the area of high turbulence below the output port 332.

Although the present invention has been herein described and illustrated in terms of particular embodiments, it is not limited to these embodiments. And other embodiments, equivalents, and modifications, which would still be encompassed by the invention, can be made by those skilled in the art, particularly in light of the foregoing teachings. Other alternative embodiments, equivalents or modifications, may be included within the spirit and scope of the invention as defined by the claims.

I claim:

1. A debris separator comprising:
   a first chamber that separates debris from debris-borne airflow and a second chamber that collects the debris;
   wherein the first chamber comprises a shroud, an input port having an inlet and adapted to connect to a debris source, an output port whereat a reduction in pressure is caused with respect to a pressure at said input port, and a barrier;
   whereby debris-borne airflow is caused to enter the first chamber through the input port by the reduction in pressure facilitated at the output port;
   said shroud having an upper portion and an outward sloping sidewall having a similarly sloping inner surface;
   said input port passing through the shroud and configured to direct the debris-borne airflow through the inlet tangential to the inner surface and parallel to the barrier;
   said output port passing through the upper portion and functioning to evacuate cleaned airflow from the first chamber;
   said barrier situated below and adjacent the inlet and having an upper surface and a peripheral opening adjacent the inner surface and functioning to reduce turbulence in the second chamber;
   whereby the sloping inner surface imparts force vectors having a y-component on the incoming debris thereby separating it from the airflow and directing it through the peripheral opening into the second chamber.

2. The device of claim 1 wherein the slope and contour of the inner surface cause substantially all the debris to pass through the peripheral opening within an arc distance A.

3. The device of claim 1, wherein said inner surface is conical.

4. The device of claim 1, wherein said inner surface is curved.

5. The device of claim 4, wherein said inner surface has a radius of curvature with a center below said upper surface.

6. The device of claim 1, wherein said inner surface extends below said upper surface.

7. The device of claim 1, wherein said input port has an inner portion.

8. The device of claim 7, wherein said inner portion is straight.

9. The device of claim 7, wherein said inner portion curves along the inner surface.

10. The device of claim 9, wherein said inner portion has an apex adjacent said sidewall and said barrier.

11. The device of claim 10, wherein said inner portion has a cross-sectional perimeter comprising a portion of the sidewall, a portion of the barrier, and an inner wall.

12. The device of claim 11, wherein a substantial portion of said peripheral opening is within said inner portion.

13. A first chamber that separates debris from debris-borne airflow and comprising:
    a shroud, an input port having an inlet and adapted to connect to a debris source, an output port whereat a reduction in pressure is caused with respect to a pressure at said input port, and a barrier;
    whereby debris-borne airflow is caused to enter the first chamber through the input port by the reduction in pressure at the output port;
    said shroud having an upper portion and an outward sloping sidewall having a similarly sloping inner surface and a lower portion adapted to join an upper edge of a second chamber;
    said input port passing through the shroud and configured to direct the debris-borne airflow through the inlet tangential to the inner surface and parallel to the barrier;
    said output port passing through the upper portion and functioning to evacuate cleaned airflow from the first chamber;
    said barrier situated below and adjacent the inlet and having an upper surface and a peripheral opening adjacent the inner surface;
    whereby the sloping inner surface imparts force vectors having a y-component on the incoming debris thereby separating it from the airflow and directing it through the peripheral opening.

14. The device of claim 13 wherein the slope and contour of the inner surface cause substantially all the debris to pass through the peripheral opening within an arc distance A.

15. The device of claim 13, wherein said inner surface extends below said upper surface.

16. The device of claim 13, wherein said input port has an inner portion.

17. The device of claim 16, wherein said inner portion curves along the inner surface.

18. The device of claim 17, wherein said inner portion has an apex adjacent said sidewall and said barrier.

19. The device of claim 18, wherein said inner portion has a cross-sectional perimeter comprising a portion of the sidewall, a portion of the barrier, and an inner wall.

20. The device of claim 19, wherein a substantial portion of said peripheral opening is within said inner portion.

* * * * *